United States Patent [19]

Wirt

[11] 4,228,867

[45] Oct. 21, 1980

[54] NOISE BARRIER

[75] Inventor: Leslie S. Wirt, Newhall, Calif.

[73] Assignee: Lockheed Corporation, Burbank, Calif.

[21] Appl. No.: 8,817

[22] Filed: Feb. 2, 1979

Related U.S. Application Data

[62] Division of Ser. No. 742,404, Nov. 16, 1976, Pat. No. 4,175,639.

[51] Int. Cl.[3] ........................ G10K 11/00; B64F 1/26; E10F 15/00

[52] U.S. Cl. .................................... 181/210; 181/284; 181/295; 256/13.1; 256/24; 256/19

[58] Field of Search ............... 181/210, 295, 284, 285; 244/114 B; 256/24, 73, 19, 13.1, 14, 1, 65; 105/452; 104/1 R

[56] References Cited

U.S. PATENT DOCUMENTS

| | | | |
|---|---|---|---|
| 119,509 | 10/1871 | Darrach | 256/73 |
| 2,027,493 | 1/1936 | Thilborger | 256/19 |
| 2,588,147 | 3/1952 | Morris | 256/73 |
| 3,037,726 | 6/1962 | Phillips | 181/210 |
| 3,049,203 | 8/1962 | Bayer | 256/24 |
| 3,509,964 | 5/1970 | Eckel | 181/295 |
| 3,578,105 | 5/1971 | Griff | 181/295 |
| 3,783,968 | 1/1974 | Derry | 244/114 B |
| 3,988,009 | 10/1976 | Mann | 256/24 |
| 4,015,682 | 4/1977 | Keller | 181/210 |
| 4,069,768 | 1/1978 | Matsumoto et al. | 181/210 |

*Primary Examiner*—L. T. Hix
*Assistant Examiner*—Benjamin R. Fuller
*Attorney, Agent, or Firm*—Frederic P. Smith

[57] ABSTRACT

A noise barrier wall having a transition area in the region of at least one unbounded edge and which employs controlled diffraction of sound to enhance the sound reducing properties thereacross. The transition area of the noise barrier is provided with either a row of absorptive shaped splitter panels, or a row of pickets, or other means of controlled transparency which provide acoustical shadowing equal to or greater than that of a solid wall for the frequency regions of interest.

8 Claims, 2 Drawing Figures

NOISE BARRIER

This is a division of application Ser. No. 742,404, filed 11-16-76 U.S. Pat. No. 4,175,639.

BACKGROUND OF THE INVENTION

Heretofore various types of sound barriers have been disclosed for attenuating noise emanating from a traffic area such as a highway. The simplest approach to prevent the transmission of traffic area noise to adjacent areas is the utilization of a simple wall or plate. Barriers consisting of a "plate" having elastic properties and a known thickness, affect a sound field by diffraction of sound waves around the barrier and by refraction and transmission of the sound waves. The latter two effects can be achieved with only limited success using conventional earthwork or solid, upright barriers. The diffracted sound field in the areas of the shadow zone of the barrier relative to the sound field in the absence of the barrier determines the overall effective attenuation. Prediction of the theoretical attenuation may be obtained by the well-known Fresnel integral equations.

It has been suggested that barriers be attributed with a maximum attenuation of 15 dB, due to the influence of diffraction effects over the barrier. With simple barriers, maximum noise level reductions appear to be achievable only at extreme wall heights (greater than 12 feet) and at the higher frequencies (greater than 1000 Hz).

The principal disadvantages of conventional barriers for traffic noise attenuation may be summarized as follows: (1) effective sound reduction is dependent upon barrier height, (2) barrier heights of 25 feet or more (such as would be required to achieve attenuations of 20 dB or more) do not blend aesthetically with the surrounding landscape, (3) construction costs for high level barriers (such as earth berms, depressed roadways, and concrete walls) are extremely costly, and (4) the motorist has the impresssion that he is captured within a "tunnel" and therefore loses his perspective on distance and speed.

The sound barrier of the present invention overcomes the aforementioned disadvantages of conventional barriers and obtains its employment in noise attenuation by means of a novel and improved method of utilizing the Fresnel effect. Attenuation is provided as a programmed function of height above the ground, with the greatest attention being provided near the ground (where it is most needed) and a the least at the top of the array. This graduated attenuation is provided by acoustically treated pickets or splitters which are widest at ground level and taper upwardly to a pointed terminus. In a "picket" embodiment, the pickets are erected with their flat, absorptive surfaces normal to the direction of sound propagation. In a "splitter" embodiment, the splitters are erected with their flat, absorptive surfaces parallel to the direction of sound propagation, and function as acoustically lined ducts.

It is therefore an object of the present invention to provide a novel and improved sound barrier.

It is a further object of the present invention to provide a novel and improved sound barrier which allows the transmission of light and is aesthetically acceptable as compared with solid, wall-like barriers.

Still another object of the invention is to provide a novel and improved sound barrier particularly suited for use either vertically or horizontally disposed along a highway or freeway, or other heavily traveled throughfare, or along the side of other noise producing sources, and which is generally superior to similar devices of the prior art.

DESCRIPTION OF THE PREFERRED EMBODIMENTS

As is well known, sound propagates through the air as a series of cyclical changes in the local air density, pressure, and temperature, as well as disturbances in the positions of air particles. Since these cyclical changes reoccur at regular intervals, this form of disturbance can be characterized as wave motion and treated as such for purposes of description in this specification. A well-known property of wave motion is its diffraction characteristics. The theoretical model which seems most naturally applicable to the characteristics of the present invention is that of Fresnel for diffraction of a line source producing cylindrical waves by a knife edge to a receiver, with both the source and the receiver at a finite distance from the knife edge. As embodied in a highway barrier, field measurements of the invention are complicated by ground reflections, uneven terrain, the directivity of sources, and atmospheric effects. In particular, as a result of ground plane reflections, at a particular frequency and location, a low wall may cast a deeper shadow than a high wall. However, a simplified theory has been developed from which practical predictions can be made, and empirical data have shown that an optically transparent panel area constructed in accordance with the present invention is capable of casting a deeper acoustical shadow than a solid wall.

The underlying mechanism, upon which the invention is predicated, is that either transparency gradients, or phase velocity gradients, or both, may be used to provide deeper acoustic shadows beyond the barrier than would otherwise exist. Structurally, the transparency or phase gradients are introduced near the diffracting edge of the barrier by means of a transition region that is not completely opaque to sound. The conversion of energy requires that if a shadow zone is to be deepened, the sound must be louder in some other direction. The missing energy in the shadow region may be acounted for as having been radiated in a relatively harmless direction.

Figure 1:
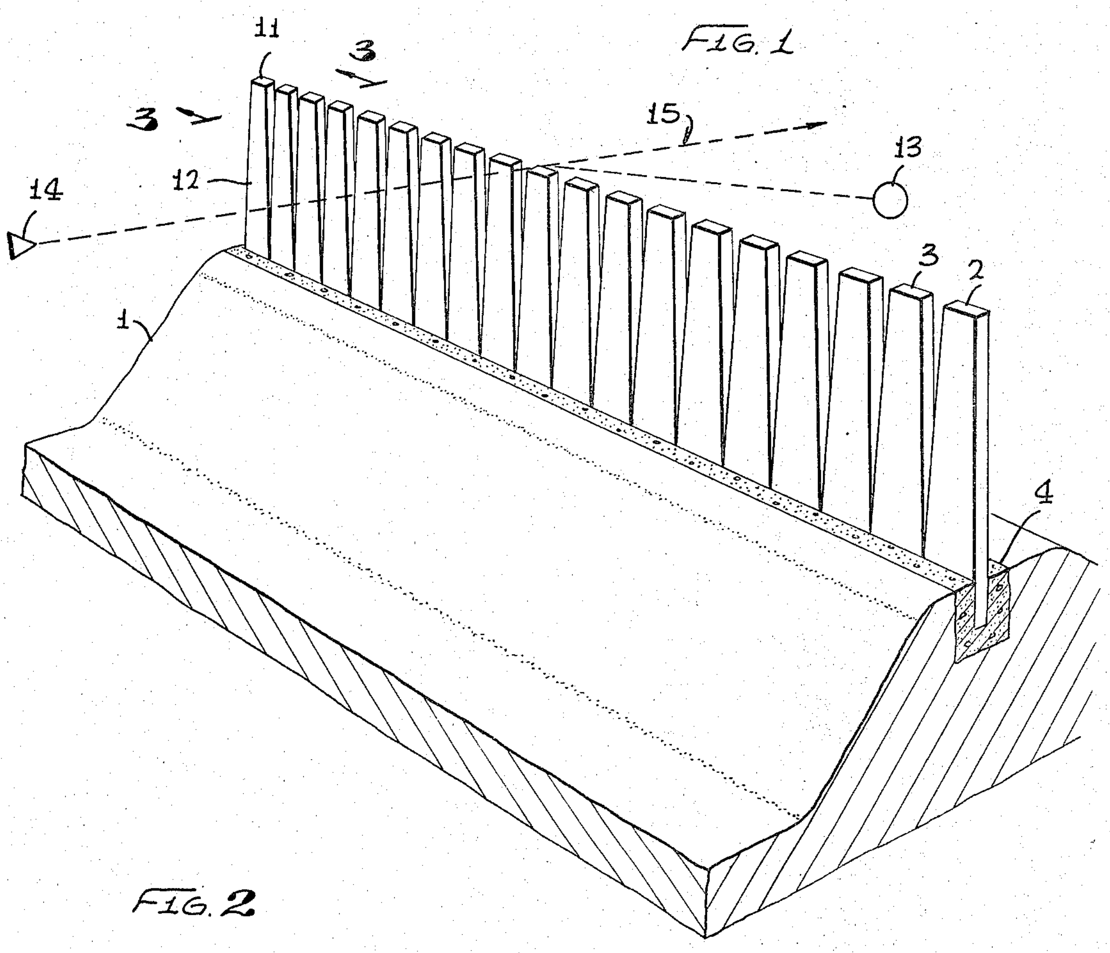
FIG. 1 is a perspective view of a sound barrier constructed in accordance with a first embodiment of the invention.
Figure 2:
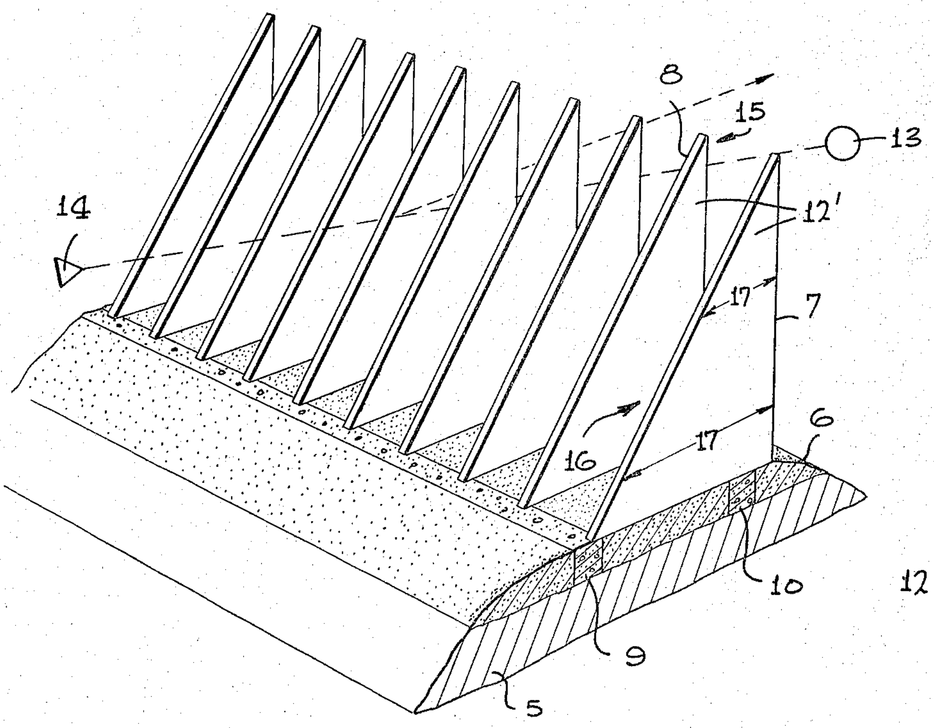
FIG. 2 is a perspective view of a sound barrier constructed in accordance with a second embodiment of the invention.

In a practical construction, designed for use along a highway, there is provided a barrier member having an acoustically opaque portion comprising a solid or earth-filled foundation with sloping, outwardly-facing walls. Extending upwardly from the foundation are the transition elements which provide the desired amplitude-attenuation gradient (changing acoustic transparency), or the desired phase advancement (or retardation) gradient, or a combination of the two gradients. The transition elements comprise a plurality of spaced-apart vertically-extending members each having a base wider than its apex. If these members are normal to the principal direction of sound wave propagation, then they may most aptly be described as tapered pickets. If these members are parallel to the principal direction of sound propagation, then they may be referred to as tapered splitters. Either structure is effective, and may be fixedly mounted atop the solid foundation. A typical picket or splitter designed to absorb the low frequencies encountered on highways is shown in FIG. 1 and would be 10 centimeters thick, extend 240 centimeters vertically from the base 1, be 60 centimeters on centers, and would produce a 3-5 dbA additional attention in the level of sound on the receiver 13 side away from the sound source 14, as compared to a solid wall of similar height the position of the noise source 14, the receiver 13 and sound shadow 15 (described hereafer) is also shown in FIG. 2.

As stated previously, the transition region through which the sound is desirably diffracted to a harmless (e.g., upward) direction, may provide either an amplitude gradient, or a phase gradient, or both. A picket or splitter arrangement having 50% transparency overall to yield an amplitude gradient will produce a deeper sound shadow than a solid wall, over a relatively wide range of source frequencies. Obviously, there are many ways to physically product a zone of changing acoustic transparency, such as by tapering or otherwise varying the width of the spaced panel members from bottom to top. Alternatively, the acoustic resistance may vary as a function of height to provide the desired amplitude gradient.

As an alternate embodiment, the transition region may provide a phase gradient to deepen the sound shadow 15. This may be achieved by splitter panels which are of triangular form with the widest dimension at the base and having an upwardly diminishing width. Spaced apart rows of such splitters also may provide an amplitude gradient by graduated duct attenuation.

The facing of the elements 2 and 3 comprising the transition region should comprise acoustically absorptive material. The absorptive requirements for picket-shaped elements are not critical, but need be only absorptive enough to minimize field distortion due to pressure doubling upon reflection. Further, the efficiency as a function of frequency is sensitive to the geometry of the transition elements, although an extremely large range of shapes is possible. For example, the attenuation in the region of 1000 hertz is improved by making the top of the pickets flat instead of pointed, as is shown in FIG. 1.

There is shown in FIG. 1 an embodiment of the invention suitable for use along a highway or other traffic thoroughfare. Only a linear section of the device is shown, it being understood that it is to be extended in the direction of its major axis as far as is desired. The structure comprises an acoustically opaque base portion of earth-fill, concrete, or other suitable material formed into an upwardly sloping or vertical wall. The plurality of pickets or the like are supported by, and extend upwardly from base 1. Exemplary pickets are identified at 2 and 3, it being understood that all may be of identical configuration. The lower ends of the pickets (2-3) may be embedded within the base 1 by concrete portion 4 where the base 1 comprises an earthwork. A uniform spacing is provided between adjacent pickets, and the interstitial dimension may be that previously mentioned by way of example. It should be further understood that the interstices may be perforations, or circular apertures, or openings having a geometry other than the V-shape provided by the pickets shown. The essential characteristic of the upper portion of the structure (as viewed in FIG. 1) is that it have a zone of acoustic transparency having a gradient.

There is shown in FIG. 2 a second embodiment of the invention of the "flow duct" type. Here the earth base 5 carries a compacted gravel cover portion 6 upon which rests a plurality of spaced-apart splitters such as indicated at 7 and 8. The interstices or passages 16 between the splitter 7 and 8 function as flow ducts, with the effective path length 17 of the flow ducts diminishing in the upwardly direction. The base-end of splitters 7 and 8 may be secured to concrete foundations 9 and 10. Again, the height and center-to-center spacing of splitters 7 and 8 may be in accordance with the previously discussed example.

Figure 3:
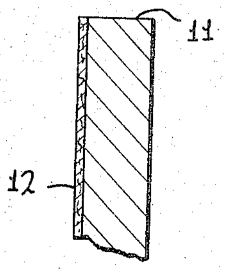
FIG. 3 is a cross-sectional view taken along line 3—3 of FIG. 1.

The planar surfaces of the pickets or splitters should be faced with an acoustically absorptive (viz., non-reflective) material. There is shown in FIG. 3 a cross section of a picket 11 which is provided with an absorptive facing 12 on the side directed towrds the sound sorce. The splitters 7,8 are shown in FIG. 2 having an absorptive facing 12' on the surfaces parallel to the direction of sound propagation. Metallic felt or other suitable material may be used as the facings 12,12' and may, if desired, be applied to all exposed surfaces.

The foregoing is considered as illustrative only of the principles of the invention. Further, since numerous modifications and changes will readily be apparent to those versed in the art, it is not desired to limit the invention to the exact construction and operation shown and described.

What is claimed is:

1. An acoustical barrier for interposition between a noise source and a noise receiver located within the acoustical shadow zone of the barrier, comprising:

a barrier member having an acoustically opaque base portion and having contiguous therewith an upwardly extending transition portion comprising a plurality of identical spaced apart elements contiguous with said base portion defining a plurality of flow ducts therebetween and each of such ducts having an effective path length which continuously decreases in said upwardly extending direction whereby the sound transmissibility between said elements follows a gradient and the sound transmitted between said elements tends to apply a phase opposition to the sound arriving at the noise receiver by refraction in the acoustical barrier through a region outside said shadow zone and thereby effectively redirect such refracted sound away from said noise receiver.

2. An acoustical barrier as defined in claim 1, wherein each adjacent pair of said spaced apart elements comprises one of said flow ducts and wherein the upwardly decreasing path length of each duct provides said transmissibility gradient.

3. An acoustical barrier as defined in claim 2 wherein the effective path length of each duct produces an amplitude change in the sound transmitted therethrough.

4. An acoustical barrier as defined in claim 2 wherein the effective path length of each duct attenuates the sound transmitted therethrough.

5. An acoustical barrier as defined in claim 1 wherein the elements comprising said transition portion each have an upwardly decreasing effective length which produces an amplitude gradient with respect to sound transmitted therethrough.

6. An acoustical barrier as defined in claim 1, wherein the elements comprising said transition portion produce both an amplitude gradient and a phase velocity gradient in the sound transmitted therethrough.

7. An acoustical barrier as defined in claim 1, wherein each of said elements comprising said transition portion comprises:

an upwardly extending panel having a substantially uniform thickness and a width which continuously diminishes in said upwardly extending direction.

8. An acoustical barrier as defined in claim 7 wherein at least one surface of said panel is acoustically absorptive.

* * * * *